United States Patent Office 2,952,653
Patented Sept. 13, 1960

2,952,653

COMPOSITION COMPRISING A VINYLIDENE CYANIDE COPOLYMER AND A CYANOETHYL COMPOUND AS PLASTICIZER

Hansjorg Heller, Akron, Ohio, assignor to The B. F. Goodrich Company, New York, N.Y., a corporation of New York No Drawing. Filed Aug. 3, 1955, Ser. No. 526,312

7 Claims. (Cl. 260—30.8)

This invention relates to novel compositions of matter comprising synthetic polymers and interpolymers containing dinitrile

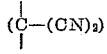

groups plasticized with cyanoethylated organic compounds, and more particularly relates to strong flexible films and rigid, impact resisting structures (rods, tubes, honeycombs) made of a dinitrile-containing synthetic polymer plasticized with a reaction product of acrylonitrile with certain compounds containing reactive hydrogen. Even more particularly, this invention refers to vinylidene cyanide interpolymers improved by plasticization with organic compounds containing —CH$_2$CH$_2$CN groups.

U.S. Patents 2,476,270, 2,502,412 and 2,414,387 disclose novel methods for the preparation of monomeric vinylidene cyanide, also named, 1,1-dicyano ethylene, which is a clear liquid at room temperature and a crystalline solid at 0° C., possessing a melting point when in purest form of about 9.7° C. and which undergoes on contact with water an instantaneous homopolymerization reaction to give a solid water-insoluble resin. On copolymerization of this monomer in mass or in anhydrous organic medium with various other polymerizable materials there are obtained copolymers which are extremely useful in the preparation of filaments, films and shaped articles possessing many valuable properties including high tensile strength, low elongation and excellent resistance to the action of chemicals and the weather.

It has been found, however, that vinylidene cyanide interpolymers, because of extremely high softening or melting temperatures are quite difficult to process by normal mixing, milling, or calendering to form sheets, films and the like. It has been found further that vinylidene cyanide interpolymers rapidly degrade when heated to temperatures at which they soften or melt so that even though said polymers might be heated during processing to softening point temperature, degradation of the polymers would severely limit commercial use of them. Reduction of melt viscosity of vinylidene cyanide interpolymers by the addition thereto of a plasticizer has heretofore been unsuccessful since most commercially available plasticizers are incompatible with dinitrile-containing interpolymers.

For instance, a wide variety of plasticizers is known for vinyl resins, but nearly all are incompatible with dinitrile-containing resins, particularly vinylidene cyanide resins. As a result there has been an extensive search for materials that will blend smoothly and homogeneously with vinylidene cyanide resins, to give them lower processing temperatures and to enable them to retain flexibility when cast or milled into films and sheets and exposed to a range of temperature, mechanical or electrical stresses, and to retain impact resistance when formed into structural shapes.

A good plasticizer must be compatible with its base resin to the extent that thin films and sheets (.005 to .250 inch thick) made therefrom are optically clear and exhibit no streaks, haze, cloudiness, particle precipitation or oil exudation.

Some materials that show promise as plasticizers for vinylidene cyanide resins are: esters of 4-oxocarboxylic acids as disclosed in my copending application, Serial No. 531,591, now Patent No. 2,838,467, organic sulfonamides as disclosed in my copending application, Serial No. 531,592, now Patent No. 2,855,375, alkyl phosphates, alkyl amido phosphates, alkyl benzenesulfonates, glycol-substituted benzenesulfonates, and alkyl-substituted acetamides.

It is an object of this invention to provide novel compositions comprising a vinylidene cyanide polymer together with a plasticizer compatible with the polymer at both elevated and reduced temperatures. It is another object of this invention to provide a vinylidene cyanide polymer plasticizer which reduces the melt viscosity of the polymer at elevated temperatures. Still another object of this invention is to provide plasticized vinylidene cyanide polymer which has good low temperature flexibility. A further object of this invention is to provide structural shapes of vinylidene cyanide polymers which have high impact strength and shock resistance.

It has now been discovered that the above and other objects are readily attained by plasticizing vinylidene cyanide polymers with certain materials of a class of cyanoethylated organic compounds. When admixed with vinylidene cyanide polymers, as plasticizers therefor, such compounds lower the polymer softening points, thereby making the polymers more easily processable, increase polymer flexibility, and improve resistance to compressive stress. The plasticizers are easily added to the polymers in conventional rubber and plastics mixing equipment.

The cyanoethylated organic compounds which are used as plasticizers according to this invention contain at least one cyanoethyl (—CH$_2$—CH$_2$—CN) radical, preferably from 2 to 4 such radicals, present in one of the following structural groups:

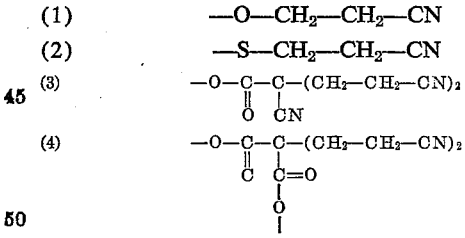

They may be prepared by known methods for example by the reaction of acrylonitrile with a compound containing one or more reactive hydrogen atoms such as (1) the various alcohols, glycols, hydroxyl-terminated esters and polyesters which contain reactive hydrogen on the —OH groups and react with acrylonitrile to give compounds containing structure (1) above; (2) hydrogen sulfide and the various organic thiols which contain reactive hydrogen in —SH groups and react with acrylonitrile to give compounds containing structure (2) above; and (3) cyanoacetic acid esters and malonic acid esters which contain reactive hydrogen in the methylene (—CH$_2$—) group and react with acrylonitrile to give compounds containing structures (3) or (4) above.

Preferably the cyanoethylated compounds contain, in addition to structural groups as set forth in (1) to (4) above, only carbon and hydrogen atoms or only carbon and hydrogen atoms and oxygen atoms present in ester

groups

Illustrative examples of preferred cyanoethylated compounds containing the —O—CH$_2$—CH$_2$—CN grouping are the following:

(a) Compounds of the formula

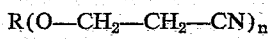

R(O—CH$_2$—CH$_2$—CN)$_n$ wherein R is a hydrocarbon radical and $n$ represents the valance of R. R may be an alkyl, cycloalkyl, or aryl residue of two to twelve carbon atoms. Examples of these compounds include: dicyanoethyl ethylene glycol, tricyanoethyl glycerol, tricyanoethyl-1,2,4-butanetriol, dicyanoethyl - 3 - methylene - 1,5 - pentanediol, dicyanoethylneopentyl glycol, cyanoethyl cyclohexanol, cyanoethyl phenol, and dicyanoethylhexamethylene glycol.

(b) Compounds of the formula

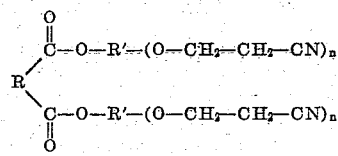

where R is a bivalent hydrocarbon radical and R' is a polyvalent hydrocarbon radical including dicyanoethyl diethylene glycol malonate, dicyanoethyl dihexamethylene glycol succinate, dicyanoethyl diethylene glycol phthalate, tetracyanoethyl propanediol succinate, tetracyanoethyl propanediol pimelate, among others.

Illustrative examples of preferred cyanoethylated compounds containing the (—S—CH$_2$—CH$_2$—CN) structure are dicyanoethyl sulfide, dicyanoethyl disulfide, cyanoethyl ethyl mercaptan, cyanoethyl cyclohexyl mercaptan, and cyanoethyl phenyl mercaptan, among others.

Illustrative examples of cyanoethylated compounds containing

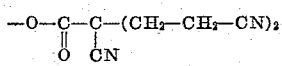

and

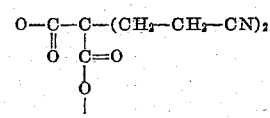

groups include dicyanoethyl propyl cyanoacetate, dicyanoethyl diethyl malonate and dicyanoethyl ethyl cyano acetate, among others.

The vinylidene cyanide interpolymers which form useful plasticized compositions when incorporated with cyanoethylated hydrocarbon compounds in accordance with this invention include homopolymeric vinylidene cyanide and, more preferably, any interpolymer of vinylidene cyanide with any other olefinic monomer or monomers copolymerizable therewith including, but not limited to, those vinylidene cyanide interpolymers described in U.S. Patents 2,615,865 to 2,615,880, 2,628,954, 2,650,911, 2,654,728, 2,654,729, 2,657,197, 2,716,104, 2,716,105, 2,716,106 and copending applications 402,823, filed January 7, 1954 now Patent 2,786,046, and 407,595, filed February 1, 1954, now abandoned, the disclosures of which are incorporated herein by reference. The most useful interpolymers are those made of 50 mole percent vinylidene cyanide and 50 mole percent of olefinic monomer which form 1 to 1 alternating copolymers with vinylidene cyanide, with the 1 to 1 molar alternating copolymer of vinylidene cyanide with vinyl acetate being most preferred.

The order of mixing ingredients to form the plasticized compositions of this invention is not critical. Plasticizer in pure form or diluted with a non-solvent for the base resin can be added to base resin or resin may be added to plasticizer. Mixing may be accomplished by agitation in heated vessels or on a heated two-roll mill, or by dissolving both the base resin and the plasticizer in a mutual solvent such as dimethyl formamide, mixing the two solutions and evaporating the solvent. When the plasticization is carried out by this latter method, it is desired that the combined plasticizer and interpolymer concentration be less than 25% by weight of the total solution. The preferred method of preparing plasticized vinylidene cyanide interpolymer compositions according to this invention is mastication by a milling or calendering operation. A suitable range of amount of plasticizer to base resin is from about 5 parts to about 200 parts of plasticizer per 100 parts of base resin with 10 parts to 100 parts being the most preferred range.

The following examples illustrate methods of plasticizing vinyldene cyanide interpolymer compositions with cyanoethylated compounds as well as the improved characteristics of such plasticized compositions when formed into sheets, films and rods. All parts are by weight unless indicated otherwise.

Example 1

453 grams of sodium sulfide were dissolved in 400 milliliters of water. This solution was filtered through glass wool into a three-necked flask and cooled to 16° C. 201 grams of acrylonitrile were added at such a rate that reactor contents temperature was held between 11° and 16° C. Stirring was continued for 3½ hours after all the acrylonitrile had been added. 200 grams of benzene were added to form an organic layer which was separated and washed twice with water, dried over calcium chloride and distilled to yield 189 grams of beta, beta'-thiodipropionitrile (also known as dicyanoethyl sulfide).

216 partrs of 1:1 molar vinylidene cyanide:vinyl acetate copolymer prepared by the teaching of U.S. Patent No. 2,615,866 and 53 parts of beta,beta'-thiodipropionitrile were mixed with stirring until a homogeneous mass was obtained. Two equal portions of the plasticizer-polymer mass were each placed between sheets of aluminum foil, placed in a heated press and subjected to 4000 pounds per square inch pressure for 15 seconds at 132° C. and 60 seconds at 128° C., respectively. Thin films, slightly hazy and slightly brittle were produced.

Example 2

The procedure of Example 1 was repeated using 63 parts of beta,beta'-thiopropionitrile and 85 parts of 1:1 molar vinylidene cyanide:vinyl acetate copolymer. Again two films were pressed, one at 134° C. for 15 seconds, the other at 122° C. for 30 seconds. Both films were clear and did not crack when flexed 180° on themselves, showing that plasticization had been accomplished.

Examples 3–5

79 grams of ethylcyanoacetate were dissolved in 150 milliliters of ether. 15 milliliters of a 35 weight percent solution of trimethylbenzyl ammonium hydroxide in methanol were added, forming a suspension. 79.7 grams of acrylonitrile were added to the suspension with stirring at a rate which kept the reactor contents at gentle reflux. Stirring was continued at room temperature for one and one-half hours after all the acrylonitrile had been added. When the mixture was allowed to settle, the cyanoethylated product was an oil layer at the bottom of the reactor. This oil layer was separated, taken up in benzene, and washed with water. After separation, it was shaken with calcium chloride and charcoal to remove water and color. A yield of 110 grams of dicyanoethyl ethyl cyanoacetate was obtained.

Varying amounts of dicyanoethyl ethylcyano acetate were mixed with 1:1 molar vinylidene cyanide:vinyl acetate copolymer on a hot block at 150° C. until clear solutions were obtained from which fibers could be drawn. Films were pressed between aluminum foil sheets for 60 seconds at varying temperatures from each of the solutions produced. The table below lists the parts by weight base resin and plasticizer, temperature in ° C. at which films were pressed and film appearance:

| Example | 3 | 4 | 5 |
|---|---|---|---|
| Parts vinylidene cyanide: vinyl acetate copolymer | 348 | 308 | 276. |
| Parts dicyanoethyl ethylcyano acetate | 52 | 92 | 125. |
| Temperature of film formation, °C. | 147 | 150 | 129. |
| Film characteristics | Clear, brittle | Clear, brittle | Clear, flexible. |

*Example 6*

Eighty parts of 1:1 molar vinylidene cyanide:vinyl acetate copolymer and 53 parts of dicyanoethyl ethylcyano acetate were mixed until a dry, free flowing powder mix was obtained, then extruded at 155° C. through a National Rubber Machinery laboratory extruder to form a smooth, clear, flexible ribbon of the plasticized interpolymer. As an indication that plasticization was effected, temperatures from 180° C. to 200° C. were required to obtain even a rough strip of the vinylidene cyanide copolymer alone.

*Examples 7 and 8*

A 50:50 vinylidene cyanide:vinyl acetate copolymer and dicyanoethyl ethylcyano acetate were mixed on a 4 inch, two-roll laboratory rubber mill at 320° F. with the materials mixing very smoothly. A control run of unplasticized vinylidene cyanide:vinyl acetate copolymer would not sheet out at 320° F. mill roll temperatures. The blended copolymer:plasticizer compositions were stripped from the mills as clear sheets about 0.125 inch thick. These sheets were molded for 3 minutes at 320° F., after which tensile samples 0.250 inch wide and 2.5 inches long were die-cut from the sheets and elongated at 100% elongation per minute to break in an Instron tensile tester. Results are set forth in the table below:

| Example | 7 | 8 | 9 |
|---|---|---|---|
| Parts copolymer | 100 | 100 | [1] 100 |
| Parts dicyanoethyl ethylcyano acetate | 50 | 100 | 0 |
| Tensile (pounds per square inch) | 3380 | 1350 | |

[1] Control.

*Examples 10, 11, 12*

To prepare tricyanoethyl glycerol, 595 grams of glycerol were added to 10 grams of 40 percent by weight solution of sodium hydroxide and heated to 40° C. 1100 grams of acrylonitrile were added with stirring at a rate such that the temperature remained at 40° C. Stirring was continued for 3 hours after all the acrylonitrile was added. After settling, the product oil layer was separated, washed twice with water, then dried at 87° C. and 15 mm. pressure for 8 hours. 1193 grams of tricyanoethyl glycerol were obtained.

Tricyanoethyl glycerol, dissolved in methyl alcohol (3 parts to 50 parts of alcohol), was added in varying amounts to a 1 to 1 molar vinylidene cyanide:vinyl acetate copolymer. In order to avoid forming lumps in the product, the mixtures were stirred at room temperature until the alcohol had evaporated. Then the samples were dried 4 hours at 60° C. in a circulating air oven. Portions were pressed between aluminum foil sheets to give films. Data are listed in the table below:

| Example | 10 | 11 | 12 |
|---|---|---|---|
| Parts vinylidene cyanide: vinyl acetate interpolymer | 11 | 14 | 11. |
| Parts tricyanoethyl glycerol | 3 | 6 | 9. |
| Time of film pressing in minutes | 2 | 1 | 1. |
| Temperature of film pressing, °C. | 145 | 155 | 155. |
| Film appearance | Clear, flexible. | Clear, flexible. | Clear, flexible. |

*Example 13*

58 parts of 1 to 1 molar vinylidene cyanide:vinyl acetate copolymer and 58 parts of tricyanoethyl glycerol were thoroughly mixed in a Sunbeam mixer until an apparently dry, free-flowing powder was obtained. This was extruded to a smooth, flexible ribbon at 155° C. compared to the 180° C.–200° C. temperatures required for unplasticized copolymer.

*Examples 14 and 15*

Two mixtures of 1 to 1 molar vinylidene cyanide:vinyl acetate copolymer and tricyanoethyl glycerol were made on a 4 inch, two-roll laboratory rubber mill at 320° F. The components milled together smoothly and easily to form clear sheets which were removed from the mill at a thickness of 0.125 inch and molded three minutes at 320° F. A control run of the unplasticized polymer would not sheet out at the 320° F. mill roll temperature. Tensile samples 0.250 inch wide and 2.5 inches long were die cut from the molded sheets and elongated to break at 100 percent elongation per minute in an Instron tensile testing machine. Data are given in the table below:

| Example | 13 | 14 | [1] 15 |
|---|---|---|---|
| Parts copolymer | 100 | 100 | 100 |
| Parts tricyanoethyl glycerol | 50 | 100 | 0 |
| Tensile in pounds per square inch | 2660 | 909 | |

[1] Control.

*Example 16*

Various cyanoethylated hydroxy compounds were combined with 1 to 1 molar vinylidene cyanide:vinyl acetate copolymer on heated two-roll mills at ratios of from 10 to 40 parts of plasticizer to 100 parts of base resin. In all cases the plasticizer fluxed smoothly into the base resin at mill temperatures of 280° F. when as little as 10 parts of plasticizer were used. When plasticizer proportions were increased, the mill temperature needed to induce thorough mixing was lowered, and at 40 parts of plasticizer to 100 parts of base resin mill temperatures of 230° F. to 240° F. were sufficient. The base resin alone did not mill at all until temperature reached about 330° F.; then it immediately crumbled and fell off the mill without forming a sheet.

The plasticized compositions were sheeted off the mills at a thickness of ⅛″. Strips 4″ long and ½″ wide were die-cut from the ⅛″ thick sheets and exposed to a modified ASTM heat distortion test. The strips were placed side by side on a rack so that they were fastened at both ends and unsupported between the fastenings. The loaded rack was placed in an oven and heated to 230° F. As the samples warmed up, they sagged, of their own weight at the mid-points. In general, the greater the sag, the more effective the plasticization. Percent distortion was calculated by measuring the total sag at the sample mid-point in inches, dividing by sample thickness (⅛ inch) and multiplying by 100. The table below lists the plasticizer used, parts of plasticizer per 100 parts vinylidene cyanide:vinyl acetate copolymer and percent distortion at 230° F.:

| Plasticizer | Percent Distortion at 230° F. | | 40 parts |
|---|---|---|---|
| | 10 parts | 20 parts | |
| Dicyanoethyl butanediol-1,4 | 25 | 75 | 150 |
| Tricyanoethyl glycerol | 25 | 90 | 225 |
| Dicyanoethyl neopentyl glycol | 10 | 25 | 50 |
| Tricyanoethyl butanetriol-1,2,4 | 0 | 30 | 100 |
| Dicyanoethyl ethylcyano acetate | 0 | 125 | 475 |

Example 17

The same materials of Example 16 were mixed in proportions of 10 parts plasticizer to 100 parts of 1 to 1 molar vinylidene cyanide: vinyl acetate copolymer to form a slurry. A cylindrical mold in a pellet press was filled with the slurry, and the mold was subjected to a pressure of 12,000 pounds per square inch. The press was then heated to 140° C. and allowed to cool slowly to room temperature before the pressure was released. In every case a clear pellet approximately 1" in diameter by 0.7" high had formed.

The pellets were placed one at a time in a Preco press at room temperature and subjected to pressures up to 40,000 p.s.i. (the maximum pressure the press would deliver) or whatever lower pressure first fractured the sample. The table below lists the particular plasticizer, the percent of the original pellet height compressed, and the pressure at which fracture was induced. In general, the higher the pressure endured by the sample the better the degree of plasticization.

| Plasticizer | Percent original height compressed | Pressure to fracture, lbs. per sq. in. |
| --- | --- | --- |
| Dicyanoethyl butanediol-1, 4 | 36.8 | 11,000 |
| Tricyanoethyl glycerol | 33.5 | 10,000 |
| Dicyanoethyl neopentyl glycol | 70.5 | [1] 40,000 |
| Tricyanoethyl butanetriol-1, 2, 4 | 13.9 | 15,000 |
| Dicyanoethyl-3-methylene-1, 5-pentane diol | 14.5 | 12,000 |
| Dicyanoethyl ethylcyano acetate | 5.7 | 13,000 |

[1] No fracture.

Example 18

In preparing another cyanoethylated plasticizer, 2.0 grams of sodium hydroxide dissolved in 20 ml. of ethylene glycol were added to 230 grams of ethylene glycol. 640 grams of acrylonitrile were added rapidly and the reactor was heated to 30° C. With heat removed, the reactor contents temperature rose to 55° C. When the temperature finally dropped, external heat was used to warm the reaction mixture to 65° C. and hold it there for one hour. The reaction mass was then cooled to room temperature, treated with the acid form of an ion exchange resin and then distilled. 231 grams of cyanoethyl glycol (B.P. 151–158° C. at 17 mm.) were obtained. Redistillation gave 209 grams (B.P. 154–156° C. at 17 mm.) of the cyanoethylated alcohol. 43 grams of phthalic anhydride were added to 100 grams of the redistilled cyanoethyl glycol along with 175 grams of benzene. Benzene was distilled off till the pot temperature rose to 180° C. Water was taken off as a benzene azeotrope at this temperature. The reactor contents were taken up in 50 milliliters of benzene, extracted twice with 50 milliliters of potassium bicarbonate solution (strength 50 grams K₂CO₃ in 250 ml. of water) and three times with 50 ml. of water. The organic layer was gently heated to 100° C. to remove low boiling fractions. Further distillation removed the product oil at 255–265° C. bath temperature and 0.7 mm. pressure. A clear, slightly yellow product, dicyanoethyldiethylene glycol phthalate plasticizer was collected.

The plasticizer was dissolved in a 50/50 mixture of acetone-ethanol at a strength of 2 parts plasticizer to 1 part solvent. Two plasticization tests were run by adding plasticizer solution to 1 to 1 molar vinylidene cyanide: vinyl acetate copolymer powder and stirring until the solvent had evaporated and a free-flowing apparently dry powder mixture was obtained. The mixture was dried in an oven for 3 hours at 65° C. and the powder was then pressed into film between aluminum foil sheets at 180° C. A control run of unplasticized powder was also made.

The table below lists parts of copolymer, parts of plasticizer per 100 parts of base resin and comments:

| Parts vinylidene cyanide: vinyl acetate copolymer | 25 | 333 | 10 |
| --- | --- | --- | --- |
| Parts dicyanoethyl diethylene glycol phthalate | 25 | 166 | 0 |
| Film flexibility | Bend 180° | Bend 180° | None—Cracked. |

The cyanoethyl compounds set out elsewhere in the specification than in the examples, when substituted for the plasticizers of the specific examples, will produce plasticized polymers and interpolymers of vinylidene cyanide in a manner corresponding to the foregoing examples. Although the examples set out above are limited to specific vinylidene cyanide copolymers, it is to be understood that any polymer or interpolymer of vinylidene cyanide will be similarly plasticized when mixed with the plasticizers of this invention. In addition, other polymers containing a plurality of

groups such as the polymers and interpolymers of chlorovinylidene cyanide may also be plasticized with the plasticizers of this invention.

The plasticized polymers prepared in accordance with this invention can be further modified by incorporating therewith such ingredients as pigments, heat and light stabilizing agents, fillers and the like.

The foregoing examples and the disclosures herein illustrate the novel plasticized polymer compositions of this invention as well as their methods of preparation. Accordingly, it is not intended that this invention be limited to the specific examples, for there are numerous compositions which may be made in accordance with this invention without deviating from the scope of this invention as set forth herein. Accordingly, it is intended that this invention shall be limited and defined only in accordance with the appended claims.

I claim:

1. A composition comprising a copolymer of about 50 mol percent vinylidene cyanide with at least one other olefinic compound copolymerizable therewith and as a plasticizer for said copolymer a compound selected from the group consisting of compounds of the structure R—(O—CH₂CH₂CN)ₙ wherein $n$ is an integer from 1 to 4, and R is a hydrocarbon radical of from 2 to 12 carbon atoms, dicyanoethyl diethylene glycol malonate,
dicyanoethyl dihexamethylene glycol succinate,
dicyanoethyl diethylene glycol phthalate,
tetracyanoethyl propanediol succinate,
tetracyano propanediol pimelate,
dicyanoethyl ethyl cyanoacetate,
dicyanoethyl propyl cyanoacetate,
dicyanoethyl diethyl malonate,
dicyanoethyl sulfide,
dicyanoethyl disulfide,
cyanoethyl ethyl mercaptan,
cyanoethyl cyclohexyl mercaptan, and
cyanoethyl phenyl mercaptan.

2. A composition according to claim 1 wherein the copolymer is a copolymer of vinylidene cyanide and vinyl acetate.

3. A composition according to claim 1 wherein the plasticizer is tricyanoethyl glycerol.

4. A composition according to claim 1 wherein the plasticizer is dicyanoethyl neopentyl glycol.

5. A composition of matter comprising an approximately equimolar interpolymer of vinylidene cyanide: vinyl acetate and as a plasticizer therefor tricyanoethyl glycerol.

6. A composition of matter comprising an approximately equimolar interpolymer of vinylidene cyanide: vinyl acetate and as a plasticizer therefor dicyanoethyl sulfide.

7. A composition of matter comprising an approximately equimolar interpolymer of vinylidene cyanide: vinyl acetate and as a plasticizer therefor dicyanoethyl ethylcyanoacetate.

References Cited in the file of this patent

UNITED STATES PATENTS

| | | |
|---|---|---|
| 2,615,866 | Gilbert | Oct. 28, 1952 |
| 2,615,870 | Folt | Oct. 28, 1952 |
| 2,658,047 | Dazzi | Nov. 3, 1953 |
| 2,750,401 | Lynn | June 12, 1956 |
| 2,790,820 | Lynn | Apr. 30, 1957 |